Jan. 15, 1924.
A. G. CAMPORINI
SHOCK ABSORBER
Filed June 3, 1921
1,480,663
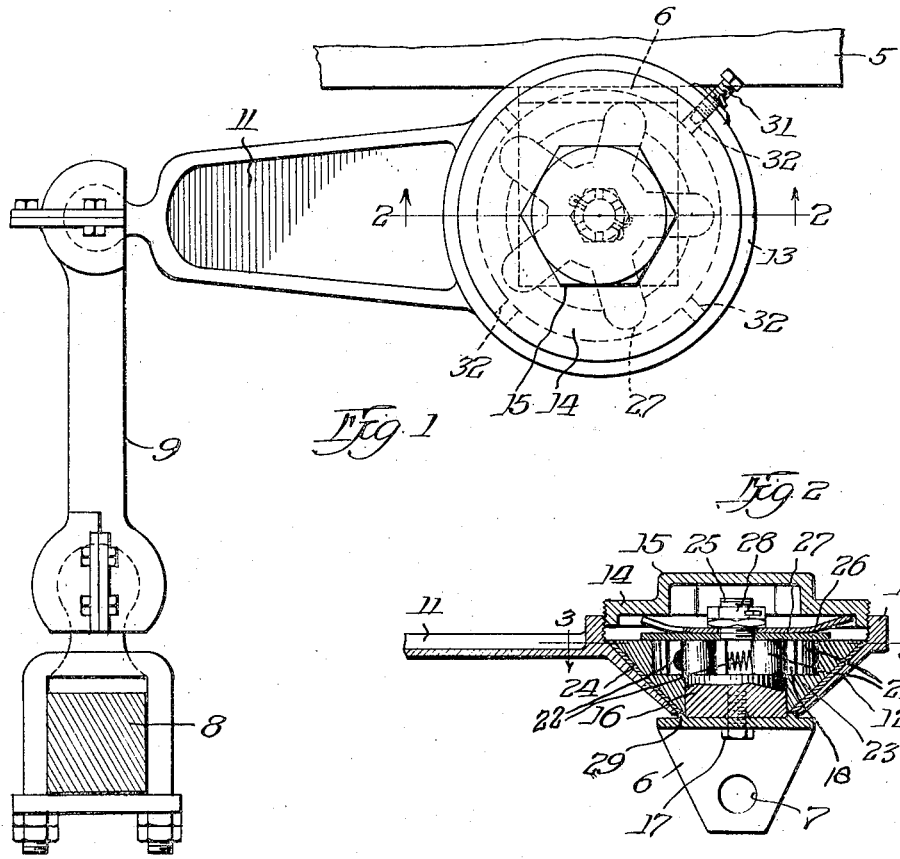
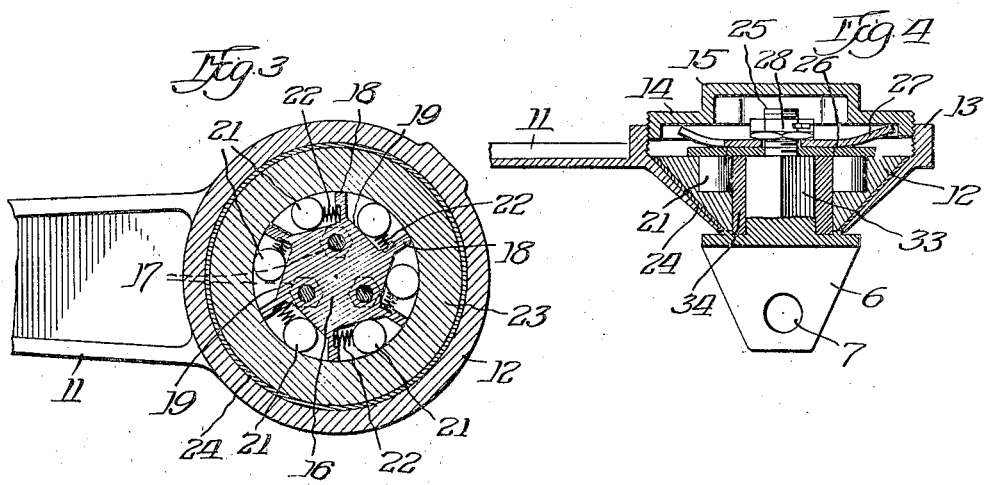
Witness:
Geo. E. Kirwan
Inventor
Augustine G. Camporini
By Ira J. Wilson
Atty.

Patented Jan. 15, 1924.

1,480,663

UNITED STATES PATENT OFFICE.

AUGUSTINE G. CAMPORINI, OF CHICAGO, ILLINOIS.

SHOCK ABSORBER.

Application filed June 3, 1921. Serial No. 474,740.

*To all whom it may concern:*

Be it known that I, AUGUSTINE G. CAMPORINI, a citizen of the United States, residing at Chicago, in the county of Cook and State of Illinois, have invented certain new and useful Improvements in Shock Absorbers, of which the following is a specification.

This invention relates to shock absorbers designed for use on motor vehicles, such as automobiles, trucks, aeroplanes, and the like, and for door checks and other purposes.

One of the primary purposes of my invention is to provide a shock absorber of the type which will offer little, if any resistance to movement of the chassis frame and axle toward each other, but will prevent rebound, which will be simple in construction, cheap to manufacture, easy to assemble and install, and will be efficient and durable in operation.

Other objects and advantages of my invention will be readily apparent as the same becomes better understood by reference to the following description when considered in connection with the accompanying drawings.

Referring to the drawings:

Fig. 1 is a side elevation of a shock absorber embodying my invention;

Fig. 2 is a sectional view on the line 2—2 of Fig. 1;

Fig. 3 is a sectional view on the line 3—3 of Fig. 2; and

Fig. 4 is a view similar to Fig. 2, showing a slightly modified form of my invention.

For purposes of illustration, my improved device is shown as applied to an automobile, reference character 5 designating one of the frame members of the chassis to which the bracket 6 of the absorber is securely attached by one or more bolts. In the present instance, one hole 7 for the reception of such a bolt is shown. The vehicle axle 8 is connected through a link 9 with an arm 11 projecting substantially horizontally from the axis of oscillation of the shock absorber.

This arm 11 is formed integrally with a housing member 12 which is frustroconical in shape, as shown in Fig. 2, the larger open end of which is interiorly screw-threaded, as indicated at 13 for the reception of a closure cap 14 preferably shaped to provide an outwardly projecting nut 15, hexagonal or otherwise in shape, and adapted to receive a wrench for adjustment purposes, as will be later explained. A hub 16 disposed concentrically within the housing member is rigidly attached to the bracket 6 by a plurality of bolts 17 and near its inner end, this hub is shaped to provide a series of notches or recesses separated by radial walls 18, the inner surface 19 of each recess being inclined so that the recess is deeper at one end than the other. Within each recess, there is disposed a roller 21 which is normally urged toward the shallow end of the recess by an expansion spring 22, and the outer wall of the recesses is formed by a friction member 23 loosely embracing the hub 16 and conically tapered at its exterior to substantially fit the interior of the housing member 12. A layer of friction material 24, which may be of fibrous or other structure, is preferably interposed between the friction member 23 and the housing member so as to afford the requisite frictional engagement upon relative movement between these members.

The inner end of hub 16 is equipped with a threaded stud 25 and the recesses in which the rollers 21 are mounted, are closed at their inner ends by a plate or washer 26 overlying the recesses and disposed upon the stud 25. A spring 27, also mounted upon the stud, is held thereon together with the plate 26, by a nut 28 threaded onto the stud. It should be observed that the inner face of the bracket member 6 is provided with an annular rib 29 which engages the end of the friction member 23 and spaces the bracket away from the housing member 12 so that no resistance to oscillatory movements of the housing member will be offered by the bracket.

The spring 27 bears at its outer ends against the inner face of the cap 14 and tends to urge the friction member 23 into frictional relation with the surrounding housing member. The amount of friction between these members may be regulated by adjusting the cap inwardly or outwardly in the housing member, and the cap is locked against accidental rotation by a lock screw 31 threaded through a tapped opening in the wall of the housing member and into one of a plurality of sockets 32 formed at spaced intervals in the perimeter of the cap.

When the device is assembled and mounted on an automobile, as shown, downward movement of the chassis relatively to the axle will cause the arm 11 to swing upwardly about its axis of oscillation, rotating the housing member 12 and the friction member 23 by reason of friction between these members, in a clockwise direction, viewing Fig. 3. The ratchet mechanism, comprising the rollers 21, mounted in the recesses comprising the inclined inner walls 19 being fixedly mounted to the chassis frame, is held against rotation, but as friction member 23 receives a rotary movement in a clockwise direction, viewing Fig. 3, these rollers will recede against the force of the light springs 22 into the deeper portions of the recesses so as to offer slight, if any, resistance to this movement of the friction member. Upon reverse movement of the parts, that is, when the chassis moves away from the axle on rebound, the housing member 12 will be oscillated in a counter-clockwise direction, viewing Figs. 1 and 3, but as soon as the friction member 23 starts in a similar direction with the housing member, its movement is checked by the wedging action of the rollers 21 between the inner perimeter of the friction member and the cam surfaces of the ratchet hub. Movement of the housing member is therefore measurably checked and can be continued only against the resistance offered by the friction between the interior of the housing member and the exterior of the friction member 23. The amount of such resistance can be regulated, as previously explained, by varying the tension of the spring 27. The device, therefore, offers practically no resistance to approaching movements of the axle and chassis, but offers material resistance to their separation and thereby prevents the objectionable rebound which customarily occurs in cars not equipped with shock absorbers.

In the modified form of my invention shown in Fig. 4, the bracket 6 is provided with an integral squared hub 33, which fits within the similarly squared sleeve 34, upon the perimeter of which the roller-receiving recesses are formed. In other respects, the construction of this form of the invention is similar to that previously explained. This form shown in Fig. 4 of the drawings, possesses some advantages of assembly, and furthermore provides a stronger connection between the bracket and the body of the shock absorber, and also eliminates the connecting bolts 17.

It is believed that my invention, its construction, mode of operation, and many of its inherent advantages will be appreciated from the foregoing without further description, and while I have shown and described a preferred embodiment, obviously, the invention may be varied materially in its details of construction without departing from the essence thereof, as defined in the following claims.

I claim:

1. In a shock absorber, the combination of a frusto-conical housing member, a friction member disposed therein and adapted to be rotated in one direction by said housing member, ratchet mechanism disposed within said friction member for holding said friction member against rotation in the opposite direction, a spring for yieldingly urging said friction and housing members together and a closure cooperating with said housing member to enclose said spring and ratchet mechanism, said closure being adjustable to regulate the tension on said spring.

2. In a shock absorber the combination of a frusto-conical housing member provided with a radially extending attaching arm, a friction member disposed therein and adapted to be rotated in one direction by said housing member, a fixed hub, ratchet mechanism disposed between said hub and said friction member for holding said friction member against rotation in the opposite direction, a spring arranged within the housing member for yieldingly urging said friction and housing members together, and manually adjustable means accessible from outside the housing and rotatable about an axis concentric with said hub for regulating the tension on said spring.

3. In a shock absorber, the combination of a hollow conically shaped housing member, a friction member disposed therein, ratchet mechanism associated with said friction member, a spring whereby said members are yieldingly forced together, and a cap threaded into the open end of said housing member to form a closure therefor, said cap being adjustable and engaged with said spring to vary the tension thereon.

4. In a shock absorber, the combination of a ratchet device adapted for attachment to a vehicle frame, a friction member circumferentially surrounding said ratchet device and provided with a frusto-conical perimeter, a housing having frusto-conical walls surrounding said friction member and frictionally engaged therewith, a spring disposed within said housing for urging the friction surfaces of said friction member and housing together, and means rotatable concentrically with said housing for regulating the tension on said spring.

5. In a shock absorber, the combination of a ratchet device provided with a bracket for attachment to a vehicle frame, a housing member surrounding said ratchet device and provided with an arm adapted for attachment to a vehicle axle, a friction member interposed between said housing member and said ratchet device, a cap adjustably threaded into the open end of said housing member to close the same, and a spring interposed between said cap and said friction member to urge said friction and housing members together, the tension of said spring being regulated by adjustment of said cap.

6. In a shock absorber, the combination of a conically-shaped housing member provided with a radially extending attaching arm, a conically shaped friction member disposed therein, a hub projecting through said friction member and provided with a plurality of inclined recesses, friction rollers disposed in said recesses between the inclined walls thereof and the surrounding wall of the friction member, an adjustable closure for the open end of said housing, and a spring interposed between said closure and said friction member and adapted to be regulated by adjustment of said closure.

AUGUSTINE G. CAMPORINI.